April 2, 1968      F. A. ANTONENKO      3,375,730
CRANK MECHANISM WITH ADJUSTABLE ECCENTRICITY
Filed Oct. 18, 1965      2 Sheets-Sheet 1
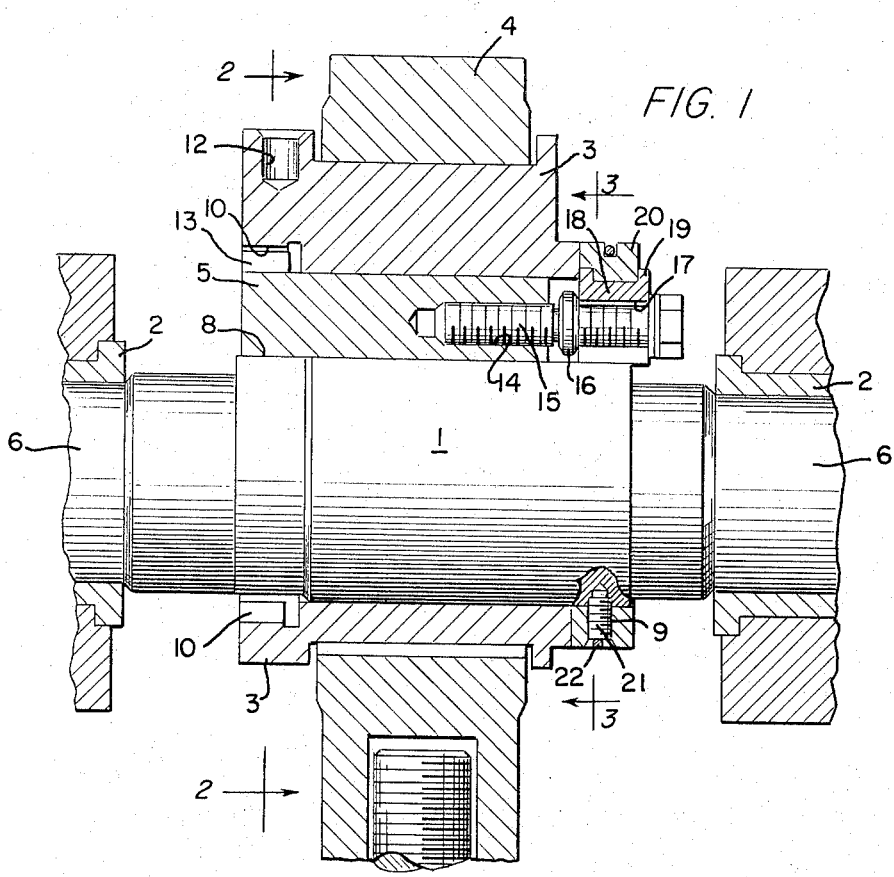
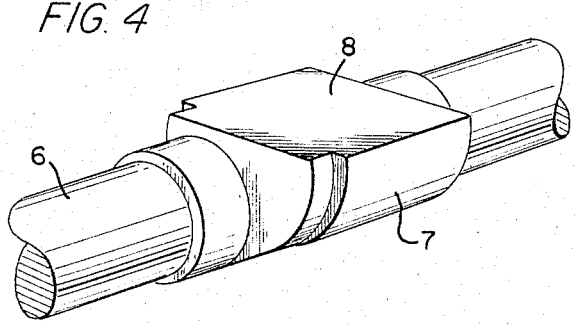
INVENTOR
FEDOR ARSENTIEVICH ANTONENKO
ATTORNEYS April 2, 1968     F. A. ANTONENKO     3,375,730
CRANK MECHANISM WITH ADJUSTABLE ECCENTRICITY
Filed Oct. 18, 1965     2 Sheets-Sheet 2
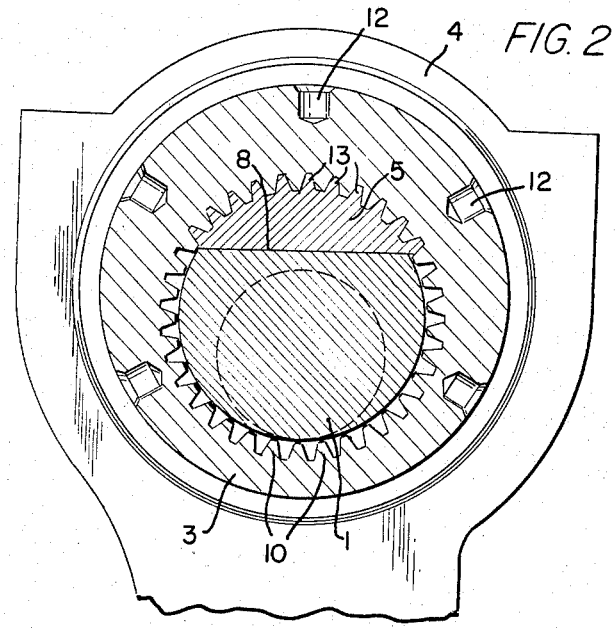
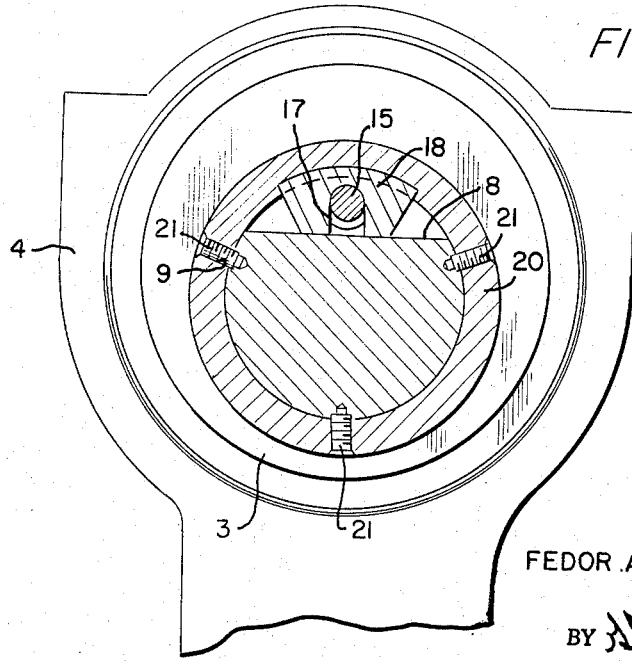
INVENTOR
FEDOR ARSENTIEVICH ANTONENKO
BY
ATTORNEYs

United States Patent Office 3,375,730
Patented Apr. 2, 1968

3,375,730
CRANK MECHANISM WITH ADJUSTABLE ECCENTRICITY
Fedor Arsentievich Antonenko, Ulitsa Shaumyana 4a, Kv. 6, Salsk, U.S.S.R.
Filed Oct. 18, 1965, Ser. No. 496,772
3 Claims. (Cl. 74—571)

ABSTRACT OF THE DISCLOSURE

An adjustable eccentric or crank in which an eccentric hub is provided on a shaft, and a sleeve having an external cylindrical bearing surface and an eccentric bore therethrough is mounted on said eccentric hub, said hub having a segmental portion removed to provide a segmental space between said hub and the eccentric bore in said sleeve; a segmental member provided to retain said hub and sleeve against relative rotation in any adjusted position by locking means acting between said segmental member and said sleeve.

---

The present invention relates to crank mechanisms with adjustable eccentricity, and, more particularly it relates to crank mechanisms for mechanical presses and like machines.

The known crank mechanisms with adjustable eccentricity, used for the same purposes, comprise an eccentric shaft associated with an eccentric sleeve and a member for retaining the eccentric sleeve in a desired angular portion, said member being slidably mounted on said shaft.

In the known crank mechanisms with adjustable eccentricity a dog-type or a jaw-type coupling is used as the member for retaining the eccentric sleeve in a desired angular position, said coupling being mounted adjacent to the face end of said eccentric sleeve together with a nut associated with said sleeve and used for adjusting said member in the axial direction.

This known construction of the retaining member leads to an increased axial dimension of the crank mechanism, and, consequently, to an increased spacing between the bearings supporting the eccentric shaft, which is also quite undesirable. Moreover the eccentric shaft of such a crank mechanism has a cylindrical journal portion whose manufacture as well as the manufacture of the shaft itself from a workpiece is a very complicated process.

Other known constructions of crank mechanisms with adjustable eccentricity, used for the same purposes, have a cylindrical shaft with an eccentric journal portion, in which said eccentric journal portion is formed for the sake of simplified manufacturing by interposing an additional eccentric sleeve between the shaft and the main eccentric sleeve.

However, this last-mentioned construction of the eccentric shaft considerably increases the weight of the crank mechanism, which adversely effects the operation of the machine.

In addition to that, the splined connection between the shaft and the additional sleeve leads to an increased wear of the shaft, when the crank mechanism is operated.

It is an object of the present invention to overcome the above-mentioned disadvantages of said known constructions of crank mechanisms with adjustable eccentricity.

Another object of the present invention is the provision of a crank mechanism with adjustable eccentricity, which will be both simple in construction and reliable in operation.

With these and other objects in view, the present invention is concerned with a crank mechanism comprising an eccentric shaft associated with an eccentric sleeve and a member for retaining said eccentric sleeve in a desired angular position in relation to said shaft, said member being slidably supported by said shaft; the eccentric journal of said shaft having a cutaway portion defining a longitudinally extending planar surface, a gap being formed between the internal cylindrical surface of said sleeve and said planar surface, said member for retaining said sleeve in a desired angular position in relation to said shaft being shaped to conform to said gap and being slidably received within said gap.

The retaining of the eccentric sleeve in a desired angular position can be further facilitated by the provision of an internal toothed rim on the cylindrical surface of the sleeve, the teeth of the rim being engaged by the teeth provided on the end portion of said retaining member.

Preferably, the member for retaining the eccentric sleeve in a desired angular position is provided with an axially extending threaded bore with a screw threaded into said bore, said screw being used for effecting the sliding motion of said retaining member axially in said gap, when the eccentricity of the mechanism is being adjusted.

Other objects and advantages of the present invention will be made apparent from the following description, due reference being made to the accompanying drawings, wherein:

FIG. 1 is a schematic longitudinal sectional view of a crank mechanism embodying the present invention;

FIG. 2 is the same mechanism viewed along the arrow line A of FIG. 1, with part of hte eccentric journal of the shaft being cut out;

FIG. 3 is the sectional view taken along the line B—B of FIG. 1; and

FIG. 4 is a perspective view of the shaft and the eccentric journal thereon.

In describing the preferred embodiment of the present invention illustrated in the drawings specific terminology will be resorted to for the sake of clarity. However, it is not intended to be limited to the specific terms so selected, and it is to be understood that each specific term includes all technical equivalents which operate in a similar manner to accomplish a similar purpose.

According to the embodiment of the present invention, the crank mechanism with adjustable eccentricity (FIGS. 1, 2 and 3) comprises an eccentric shaft 1 mounted for rotation in bearings 2, an eccentric sleeve 3 mounted upon the eccentric shaft 1 and operatively connected with a connecting rod 4, and a segmental retaining member 5.

The eccentric shaft 1 has journals 6 received within the bearings 2, eccentric journal 7 with a cutaway segmental portion defined by the axially extending plane 8 as seen in FIG. 4 and three recesses 9.

The eccentric sleeve 3 is provided with teeth 10 on its internal cylindrical surface. The external journal 11 of the sleeve 3 is adatped to fit into the cylindrical bore of the connecting rod 4. One of the end portions of the sleeve 3 has an increased diameter, recesses 12 being provided in this end portion to receive the end of a lever (not shown) by means of which the sleeve 3 can be rotated when its angular position is being adjusted.

The retaining member 5 is shaped as a segment fitting into the gap formed between the plane 8 defining the cut-away portion of the eccentric journal 7 and the internal cylindrical surface of the sleeve 3, this gap also having the shape of a segment.

Teeth 13 are formed on one end portion of the retaining member 5, the teeth being engageable by the teeth 10 provided on the internal cylindrical portion of the sleeve 3. The other end portion of the member 5 has a threaded bore 14 receiving a screw 15.

The screw 15 has between its head and the threaded portion an annular abutment portion 16. The screw 15 is partly received within a notch 17 of a segment-shaped block 18 resting upon the planar surface 8 of the cutaway portion of the shaft 1. Projections 19 are provided along the periphery of the block 18 for positioning a thrust ring 20 on the eccentric shaft 1.

The thrust ring 20 has three threaded bores spaced around the periphery thereof, lock screws 21 being threadedly received within these bores and engaging the recesses 9 provided around the periphery of the eccentric shaft 1. The lock screws 21 are retained by a split resilient ring 22 fitting into the groove provided around the periphery of the thrust ring 20. The thrust ring 20 is meant for retaining together with the member 5 the eccentric sleeve 3 in a desired angular position in relation to the eccentric shaft 1.

When the eccentricity of the crank mechanism is to be adjusted, the retaining member 5 should be disengaged from the eccentric sleeve 3. This disengagement is effected by rotating the screw 15, whereby the retaining member 5 is axially displaced along the planar surface 8 of the cutaway portion of the eccentric shaft 1. After the teeth 13 of the member 5 are completely free of the teeth 10 of the sleeve 3, a lever (not shown) is put into any one of the recesses 12 in the sleeve 3, whereafter the latter can be rotated in either direction into an angular position corresponding to the desired eccentricity of the crank mechanism. This done, the screw 15 is rotated in the opposite direction for the member 5 to slide back till the teeth 13 of said member completely mesh with the internal teeth 10 of the sleeve 3.

The plane 8 defining the cutaway portion of the eccentric shaft 1 and the planar surface of the member 5 coacting therewith can be made slightly inclined to the axis of the shaft 1 to take away play in the engagement of the associated parts.

The present invention can be employed in various presses and like machines making use of crank mechanisms with adjustable eccentricity, e.g. in eccentric presses, eccentric punching machines, in forging machinery, etc.

It is to be understood by those skilled in the art that although the present invention has been described in connection with a preferred embodiment thereof, numerous changes and variations can be made without departing essentially from the spirit and scope of the invention, as set forth in the appended claims.

What I claim is:

1. A crank mechanism with adjustable eccentricity for use in an eccentric press or like machine, said mechanism comprising a rotatable shaft having an eccentric journal said journal having a longitudinally extending cutaway portion; a sleeve provided with an eccentric cylindrical bore mounted upon said eccentric journal, a segment-shaped gap being formed between the internal cylindrical surface of said sleeve and the plane defining said cutaway portion of said journal; a member for retaining said sleeve in a desired angular position in relation to said shaft, said member being slidably supported by said shaft, said member being segment-shaped to conform to said gap and to be received therein, and means on said member locking said member to said sleeve.

2. A crank mechanism with adjustable eccentricity for use in eccentric presses and like machines, said mechanism comprising a rotatable shaft having an eccentric journal, said journal having a longitudinally extending cutaway portion; an eccentric sleeve provided with radial teeth on the internal cylindrical surface thereof, said sleeve being mounted upon said shaft, a gap being formed between the internal cylindrical surface of said sleeve and the plane defining said cutaway portion of said journal; a member slidably mounted upon said shaft, said member being shaped to conform to said gap and received therein; said member having teeth on one end portion thereof, said teeth of said member being engageable by said teeth provided on said internal surface of said sleeve, whereby said sleeve can be retained in a desired angular position in relation to said shaft.

3. A crank mechanism with adjustable eccentricity for use in eccentric presses and like machines, said mechanism comprising a rotatable shaft having an eccentric journal, said journal having a longitudinally extending cutaway portion; an eccentric sleeve provided with radially extending teeth on the internal cylindrical surface thereof, said sleeve being mounted upon said eccentric journal of said shaft, a gap being formed between said internal cylindrical surface of said sleeve and the plane defining said cutaway portion of said journal; a member slidably mounted upon said shaft, said member being shaped to conform to said gap and received therein, said member having radially extending teeth on one end portion thereof, said last-mentioned teeth being engageable by said teeth provided on said internal surface of said sleeve, whereby said sleeve can be retained in a desired angular position in relation to said shaft; and means for effecting sliding motion of said member axially within said gap, while the eccentricity of said mechanism is being adjusted.

References Cited

UNITED STATES PATENTS

| 447,386 | 3/1891 | Vuillier | 74—571 |
| 1,875,180 | 8/1932 | Rider | 74—571 X |
| 1,998,242 | 4/1935 | Klocke | 74—571 |

FOREIGN PATENTS

| 729,838 | 5/1955 | Great Britain. |

FRED C. MATTERN, JR., *Primary Examiner.*

W. S. RATLIFF, *Assistant Examiner.*